(12) United States Patent
Haines

(10) Patent No.: US 8,291,294 B2
(45) Date of Patent: Oct. 16, 2012

(54) INTERSYMBOL INTERFERENCE ENCODING IN A SOLID STATE DRIVE

(75) Inventor: Jonathan Williams Haines, Boulder, CO (US)

(73) Assignee: Seagate Technology LLC, Cupertino, CA (US)

(*) Notice: Subject to any disclaimer, the term of this patent is extended or adjusted under 35 U.S.C. 154(b) by 672 days.

(21) Appl. No.: 12/470,108

(22) Filed: May 21, 2009

(65) Prior Publication Data

US 2010/0299577 A1    Nov. 25, 2010

(51) Int. Cl.
G11C 29/00 (2006.01)
(52) U.S. Cl. .................. 714/763; 714/786; 365/185.33; 375/144; 375/148; 375/286
(58) Field of Classification Search .................. 714/752, 714/763, 786; 365/185.33; 375/144, 148, 375/286
See application file for complete search history.

(56) References Cited

U.S. PATENT DOCUMENTS

| | | | | |
|---|---|---|---|---|
| 5,311,547 A * | 5/1994 | Wei | .............. | 375/290 |
| 5,343,335 A * | 8/1994 | Hara | .............. | 360/45 |
| 5,487,089 A * | 1/1996 | Misaizu et al. | .............. | 375/296 |
| 5,761,243 A * | 6/1998 | Russell et al. | .............. | 375/233 |
| 6,243,412 B1 * | 6/2001 | Fukawa | .............. | 375/219 |
| 6,809,999 B1 * | 10/2004 | Kim et al. | .............. | 369/53.12 |
| 7,453,723 B2 | 11/2008 | Radke | | |
| 7,653,154 B2 * | 1/2010 | Haratsch | .............. | 375/341 |
| 7,697,325 B2 | 4/2010 | Sprouse et al. | | |
| 7,830,718 B2 | 11/2010 | Sarin et al. | | |
| 7,848,465 B2 * | 12/2010 | Bliss et al. | .............. | 375/341 |
| 7,978,797 B2 * | 7/2011 | Marrow | .............. | 375/346 |
| 8,095,857 B2 * | 1/2012 | Azadet et al. | .............. | 714/792 |
| 2010/0302871 A1 | 12/2010 | Haines et al. | | |

OTHER PUBLICATIONS

Giulio G. Marotta et al., "Memory Circuit Technologies" taken from "Nonvolatile Memory Technologies with Emphasis on Flash", 2008; cover, table of contents, pp. 66-75; published by John Wiley & Sons, Inc. Hoboken, New Jersey.
An-Tze Yu and Hsiao-Chuan Wang., "Channel Effect Compensation in LSF Domain" EURASIP Journal on Applied Signal Processing, Received Apr. 15, 2003; Revised May 9, 2003, pp. 922-929, vol. 2003, issue 9, Hindawi Publishing Corporation, New York, New York.
Louis Scharf, Microsoft PowerPoint—TensorComm "Interference Cancellation as a Mobile Enhancement to Improve Spectral Efficiency" Apr. 2006, pp. 1-17.
Prosecution documents associated with U.S. Appl. No. 12/474,843 including: Office Action mailed Jan. 1, 2011.

* cited by examiner

*Primary Examiner* — Esaw Abraham
(74) *Attorney, Agent, or Firm* — Alan G. Rego; Westman, Champlin & Kelly, P.A.

(57) ABSTRACT

Methods and devices are provided for intersymbol interference encoding in a solid state drive. In an illustrative embodiment, an nth data signal is received as input to a processing component. An intersymbol interference signal applicable to the nth data signal is provided, based on a set of prior-written data in a data storage array and a set of intersymbol interference behavior of the set of prior-written data in the data storage array, the data storage array being communicatively connected to the processing component. The nth data signal and the intersymbol interference signal applicable to the nth data signal are combined into an intersymbol-interference-corrected encoding of the nth data signal. The intersymbol-interference-corrected encoding of the nth data signal is provided as output from the processing component.

19 Claims, 7 Drawing Sheets

INTERSYMBOL INTERFERENCE ENCODING IN A SOLID STATE DRIVE

BACKGROUND

Achieving increasingly greater data storage density in data storage media has been a persistent technological goal, and has posed persistent challenges.

SUMMARY

Methods and devices are provided for intersymbol interference encoding in a solid state drive. In an illustrative embodiment, an nth data signal is received as input to a processing component. An intersymbol interference signal applicable to the nth data signal is provided, based on a set of prior-written data in a data storage array and a set of intersymbol interference behavior of the set of prior-written data in the data storage array, the data storage array being communicatively connected to the processing component. The nth data signal and the intersymbol interference signal applicable to the nth data signal are combined into an intersymbol-interference-corrected encoding of the nth data signal. The intersymbol-interference-corrected encoding of the nth data signal is provided as output from the processing component.

The features described above are illustrative only rather and do not define limitations on various embodiments. Other features and benefits that characterize various embodiments will be apparent from the following detailed description, the associated drawings, and the other disclosure herein.

DETAILED DESCRIPTION

Figure 1:
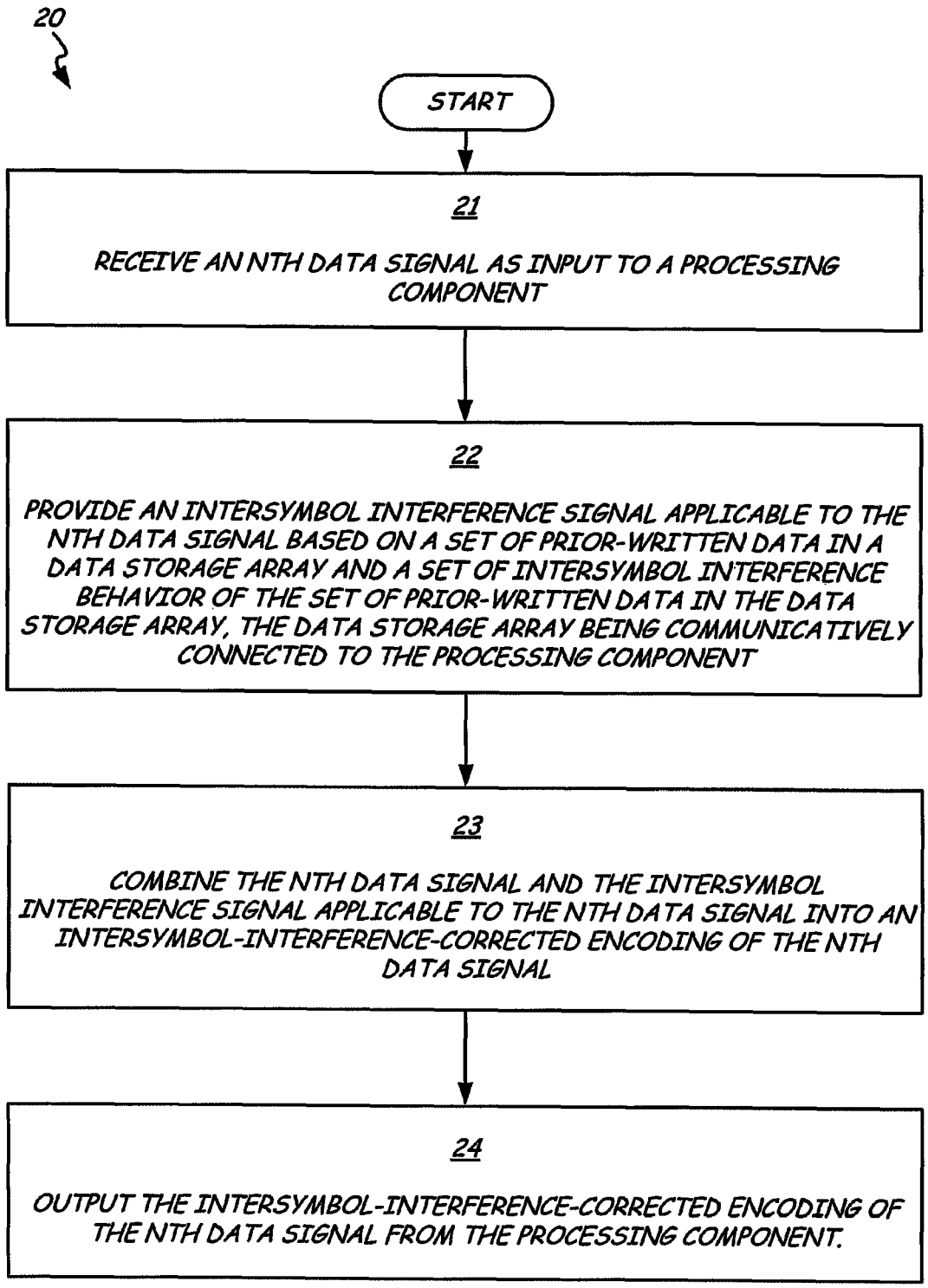
FIG. 1 depicts a flowchart for a method in accordance with an illustrative embodiment.
Figure 2:
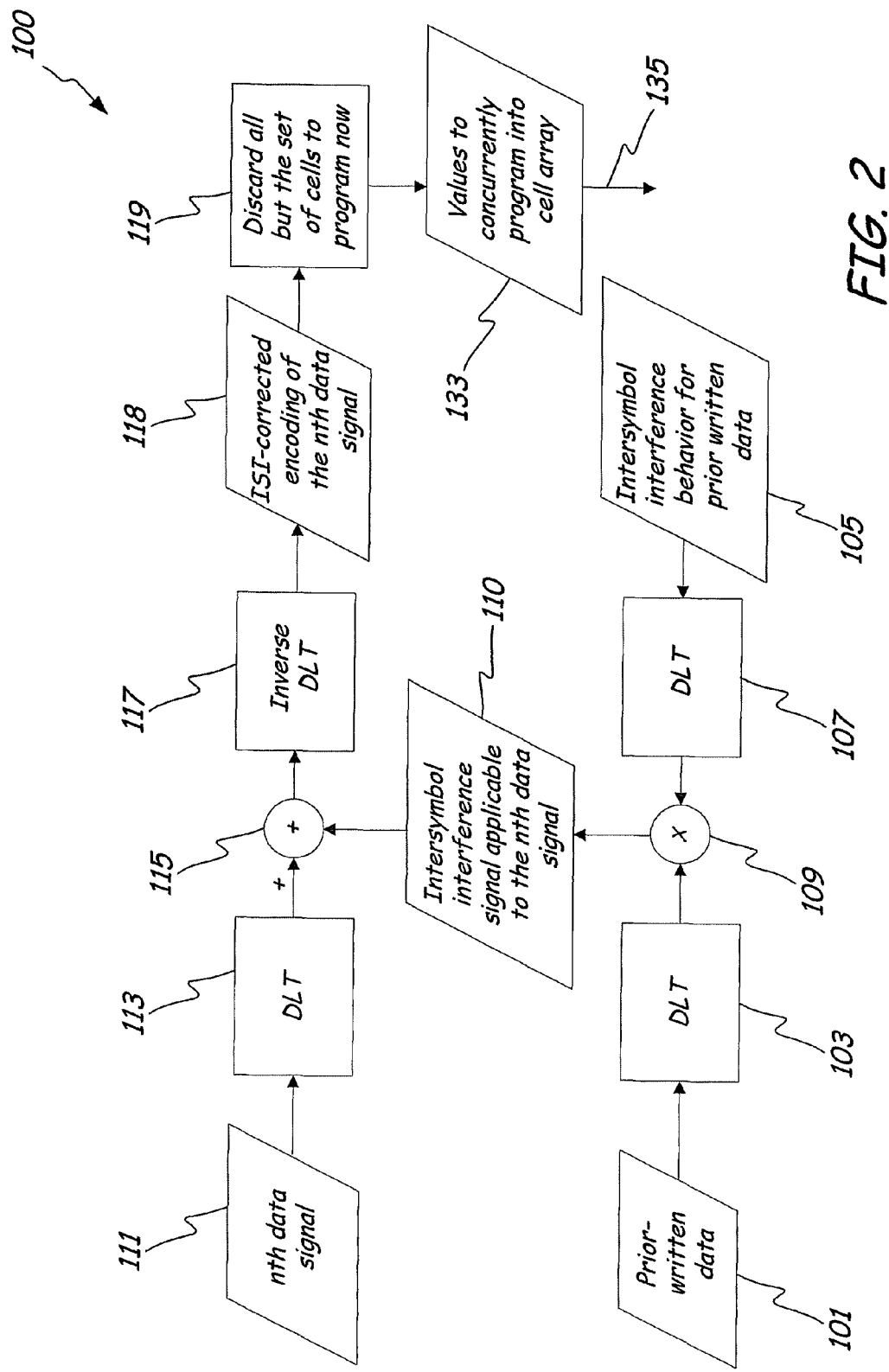
FIG. 2 depicts a block diagram for a method in accordance with an illustrative embodiment.

As an illustrative embodiment, FIG. 1 depicts a flowchart of method 20 for intersymbol interference (ISI) encoding in a non-volatile solid state data storage device. FIG. 2 depicts a block diagram of method 100 for intersymbol interference encoding in a solid state drive, according to an illustrative embodiment that is indicative of several aspects in common with method 20 of FIG. 1, while a range of variation is encompassed within the wording and other particulars indicated by the two depicted embodiments. Additional specific details about how method 20 may operate in accordance with one illustrative embodiment may be apprehended in the context of method 100 of FIG. 2, in addition to additional embodiments and features depicted in and described in connection with the subsequent figures.

For example, method 20 may include step 21, of receiving an nth data signal as input to a processing component. This may illustratively correspond to the nth data signal 111 of FIG. 2, which may be N×M cells' worth of data, for example. In this embodiment, N and M may be integers and the N×M cells' worth of data may be a quantity of data that will fit in a two-dimensional M by N array of data cells in a data storage array or block, which may be a portion of a larger data storage array, data storage device, or other arrangement of data storage, for example. In this sense, a "data storage array" may be taken to mean any set or group of data storage elements of any kind, and is not restricted to any particular terminology or reference to any particular subset of kinds of data storage elements.

Method 20 may also include step 22, of providing an intersymbol interference factor applicable to the nth data signal based on a set of prior-written data in a data storage array and a set of intersymbol interference behavior of the set of prior-written data in the data storage array, the data storage array being communicatively connected to the processing component. This may involve providing an intersymbol interference correction transform 110 applicable to the nth data signal, as in method 100, in which intersymbol interference correction transform 110 is illustratively determined by an operation 109 of multiplying discrete linear transform 103 of prior-written data 101 with an N×M discrete linear transform 107 of the intersymbol interference behavior h(x,y) 105 for prior-written data, as illustratively depicted in FIG. 2.

The prior-written data 101 may be accessed in any number of ways, including via a locally cached storage, an approximately contemporaneous read of the indicated data storage cells, or other techniques. In a particular illustrative embodiment incorporating flash data storage, and in certain other embodiments, an approximately contemporaneous read of the relevant data storage cells may be advantageous because a read operation is very rapid relative to a write operation. The intersymbol interference behavior h(x,y) 105 for prior-written data may also be determined in any of a wide variety of techniques, any of which may be compatible with method 20 and method 100, and which may illustratively include heuristically measuring the ISI of the prior-written data in the relevant section of data storage, and/or a mathematical and/or theoretical modeling of the ISI of the prior-written data in the relevant section of data storage, or a technique combining these two measures, and/or other techniques.

Step 23 of method 20 may include combining the nth data signal and the intersymbol interference signal applicable to the nth data signal into an intersymbol-interference-corrected encoding of the nth data signal. This may correspond to the summation operation 115 of FIG. 2, which is fed by an addition of transform 113 of the nth data signal 111 and the subtraction of the intersymbol interference correction transform 110 (as indicated respectively by the "+" symbol associated with the path from block 113 to 115 and the "−" symbol associated with the path from block 110 to 115). The intersymbol interference correction transform 110 is therefore subtracted from the transform 113 of the nth data signal 111, which directly represents the removal of the ISI effects of the prior-written data from the new data to be written, i.e. the nth data signal.

Method 20 may also include step 24, of outputting the intersymbol-interference-corrected encoding of the nth data signal from the processing component, i.e. the component that handles the logic operations of applying the ISI correction to the write signal. This output may correspond to output 133 of method 100, of values to concurrently program into a data storage cell array, with output operation 135 indicating that these values may be sent over a bus or other output channel to be written on a plurality of data storage cells in a destination data storage array, for example. That destination data storage array may be on-chip with the ISI correction processor, or local within a device or computer, or local within a server group or intranet, or remote, or at any location that is at least intermittently communicatively accessible to the ISI correction processor, in various embodiments.

Outputting the ISI-corrected write output may also incorporate the intermediate steps depicted in FIG. 2, including taking the N×M inverse transform 117 of the summation representing the transform of the ISI-corrected write data resulting from operation 115, thereby producing intersymbol-interference-corrected (i.e. ISI-corrected) encoding of the nth data signal 118. This may also include step 119 of discarding the ISI-corrected write signal for any data storage cells not currently to be written to, or otherwise isolating out a particular subset of ISI-corrected data for a particular write operation. This may be done iteratively so that a single ISI correction operation can be done on a relatively larger block of write data, and then the ISI-corrected block can be parceled out into a series of relatively smaller blocks of ISI-corrected write data to be sent in a series of discrete write operations to a data storage array.

Method 100 may therefore include providing an intersymbol interference signal applicable to the nth data signal based on a set of prior-written data and a set of intersymbol interference behavior of the set of prior-written data further comprises taking a discrete linear transform of the set of prior-written data, taking a discrete linear transform of the set of intersymbol interference behavior of the set of prior-written data, multiplying the discrete linear transform of the set of prior-written data and the discrete linear transform of the set of intersymbol interference behavior, and providing the resulting product as the intersymbol interference signal applicable to the nth data signal.

In an illustrative embodiment, any of the discrete linear transforms referred to herein may be calculated using a fast Fourier transform (FFT), for example, or any other technique or algorithm for determining or approximating the discrete linear transforms may also be used in different embodiments. Additionally, while some embodiments may be applied to data storage systems having a linear intersymbol interference response or only negligible departures from a linear intersymbol interference response, other embodiments may include data storage array technology or environments which are characterized by non-trivial but not extreme perturbations from linearity in the intersymbol interference response of the data storage cells. These embodiments may also include one or more steps taken to correct for non-linear effects or approximately model non-linear effects as a linear system prior to taking the discrete linear transforms of the write signal, the prior-written data, or the ISI behavior of the prior-written data, using any of a variety of approximation, correction, or perturbative techniques to correct for perturbations away from linearity in the impulse response of the intersymbol interference behavior of the data. Various embodiments may also apply different correction factors for non-linear or other effects during operations on the transforms, after taking the inverse transform, or at any other stage of the process.

The intersymbol interference (ISI) correction for data storage cells in a two-dimensional array may therefore require being determined as a correction for multi-dimensional intersymbol interference (MDISI). The corrected write signal encoding for each data storage cell may be corrected for intersymbol interference from neighboring data storage cells across the two dimensions of the data storage array. MDISI may also incorporate ISI in multiple dimensions other than simply two dimensions, such as by incorporating corrections both in two dimensions and at different points in time, for example, and/or by incorporating ISI correction across a three dimensional volume of data storage cells, as another example.

Method 100 may illustratively include intersymbol interference encoding in two or three dimensions, to correct for intersymbol interference across a two-dimensional array of data storage cells or across a three-dimensional volume of data storage cells in a solid state drive. Method 100 may illustratively be performed by or otherwise embodied in a wide variety of types of data storage devices or other digital devices, or controllers for data storage devices or other digital devices, for example. In an illustrative embodiment, method 100 may illustratively be used with types of data storage devices having linear or approximately linear intersymbol interference response, illustratively including flash memory, phase-change memory, or any multi-level cell memory data storage device, for example. Any data storage technology may be considered to have a linear intersymbol interference response if it forms a linear data storage system that supports modeling with intersymbol interference, in accordance with one illustrative embodiment. Any data storage technology may be considered to have an approximately linear intersymbol interference response, in various illustrative embodiments, if deviations from linearity at low levels of intersymbol interference are small compared with the tolerances of the system, and/or if a feasible encoding scheme can apply corrections to non-linearity to counteract minor non-linear deviations from a linear interference response, and thereby achieve similar performance, within nominally accepted tolerances in the industry, in intersymbol interference correction as if the data storage interference response was simply linear, for example. In an illustrative flash memory embodiment, method 100 for intersymbol interference encoding may eliminate the need for an additional step of biasing or forced-erasing unwritten memory cells subsequent to a write operation, thereby also substantially reducing or eliminating the need for an on-chip charge pump or for wear leveling in the data storage device, and also substantially extending the number of reliable write cycles and the useful lifetime of the data storage device.

The channel effect intersymbol interference may illustratively be provided as a function $h(x,y)$ of two-dimensional intersymbol interference of each data storage cell in an M*N two-dimensional array of previously written data storage cells on each of the other cells in the array as it is written to, in one illustrative example; or as a function $h(x,y,z)$ of three-dimensional intersymbol interference of each data storage cell in a $\mu*\nu*\rho$ three-dimensional volume of previously written cells on each of the other cells in the volume as it is written to, in another illustrative example. The calculation or representation of concurrent intersymbol interference from each previously written cell on each cell during a new write operation may take into account any factors, models, or details of the relative positions of the cells, the structures of the cells, the intervening materials and/or surrounding environmental features of the cells, additional electrical or magnetic factors or environmental influences relevant for concurrent intersymbol interference among the cells, or any other relevant factors.

As an example, in an illustrative embodiment, the initial calculation or other model of the concurrent-ISI-corrected write signal may include components that exceed the write capacity of the write signal that may be applied to the data storage cells, or that exceed the capacity of the data storage cell to respond to the write signal with a data storage response. For example, in a flash memory data storage device, the ISI-corrected write signal may include components at a higher voltage than the system's nominal maximum voltage for the write signal, or at a higher charge than the nominal maximum charge that can be stored reliably on one of the data storage cells. This may for example occur when the ISI correction factor for a given data storage cell is computed to be large compared with the original write signal and outside the normal range of the write signal, such as when it is anticipated to have to try to compensate for strong array edge effects or for a large majority of surrounding data storage cells having states opposite to that being written to the cell in question. In this case, various additional correction factors may also be applied, such as a vector of gain factors in an automatic gain control system, thereby incorporating a gain control component to compensate for write signal response constraints to the ISI correction in the data storage cells, in this illustrative embodiment.

Figure 3:
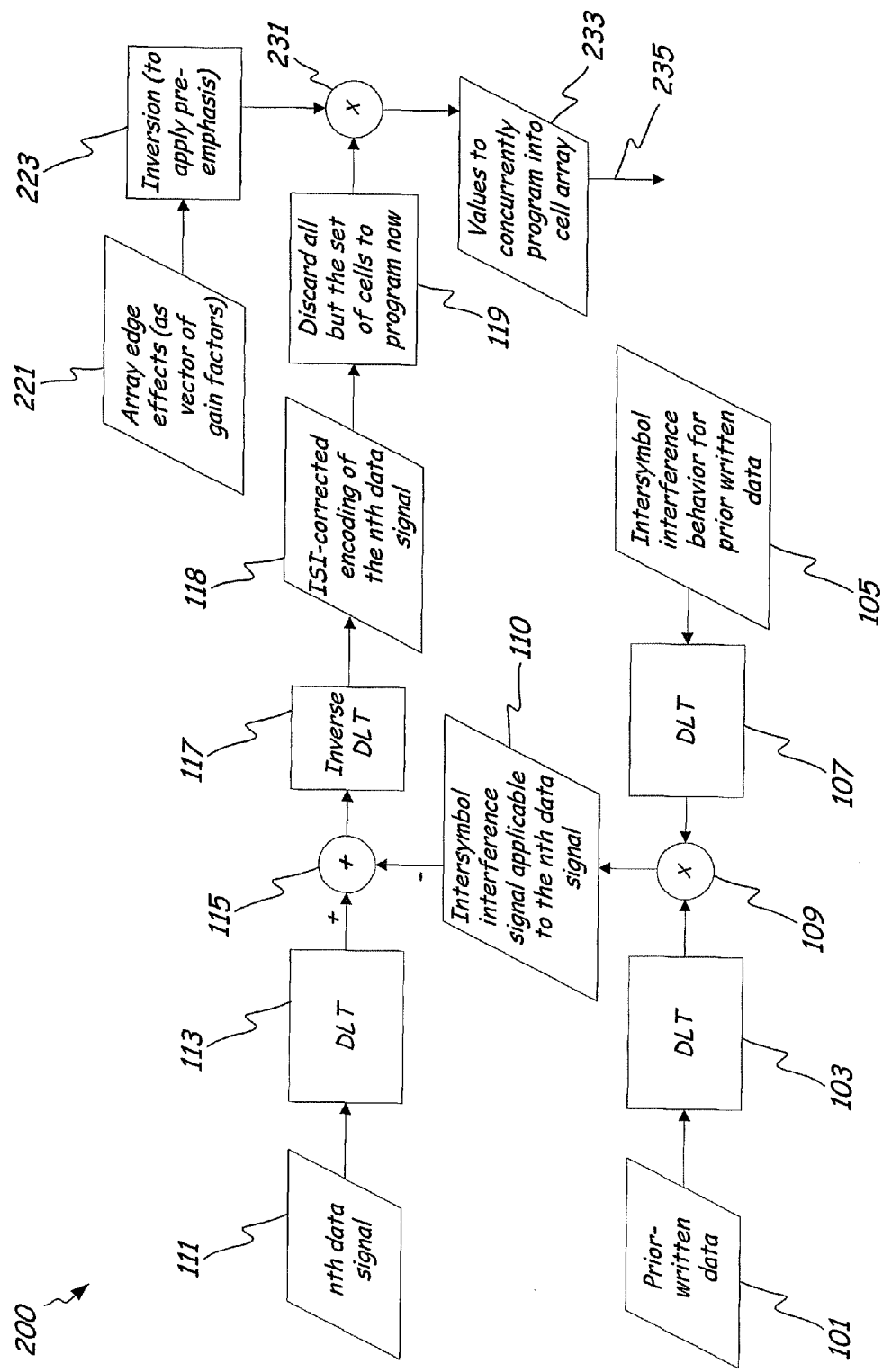
FIG. 3 depicts a block diagram for a method in accordance with another illustrative embodiment.

FIG. 3 depicts a block diagram for method 200 in accordance with another illustrative embodiment. Method 200 shares many elements in common with method 100 of FIG. 2, while method 200 also incorporates some additional features, to correct additionally for physical array edge effects in the data storage array. Physical array edge effects may be considered as a distinct effect from intersymbol interference for which correction is also advantageous, that applies in particular to data storage cells along edge sections within a data storage array. As an illustrative example, this may apply to data storage cells along the edges and corners of a programming page and/or of an erasure block in a flash memory data storage array. (Physical details of an illustrative example of this are provided below in FIG. 6 and the associated description.) Physical array edge effects may also be considered as a distinct effect from circular convolution edge effects, which may be corrected mathematically by adding additional rows and/or columns of zeroes in the matrices being operated on. Physical array edge effects may be corrected with compensation for a gain term as a function of the position of the data storage cells along the edges or other positions in the physical structure of parts of a data storage array, in an illustrative example.

Data storage cells along the edges and corners of an erasure block may be non-negligibly subjected not only to intersymbol interference from surrounding data storage cells within the erasure block, but also from additional intersymbol interference from neighboring erasure blocks and/or signal effects from signal lines running between erasure blocks, for example. An erasure block may be surrounded with erasure block shielding materials and partially isolated from outside influences by that shielding, but the effect of the shielding may be incomplete, especially with increasingly smaller feature sizes in different embodiments of data storage arrays. The intersymbol interference from these influences external to the erasure block (or other functional or structural grouping of data storage cells, in different embodiments) may be applied as a special case of intersymbol interference, which may pose unique requirements in determining and correcting for the effect discrete from the "standard" within-block ISI, and for which it may be advantageous to treat separately in how the special ISI effects are determined and/or corrected for. Any combination of correction and/or compensation for standard ISI, edge-cell ISI, physical array edge effects, circular convolution edge effects, and/or other behaviors or effects may be applied in different embodiments.

Therefore, FIG. 3 depicts an illustrative embodiment in which array edge effects 221 are represented as a vector of gain factors (while a matrix, above-one-dimensional tensor, or other representation may also be used in various embodiments). Method 200 then includes step 223 of inversion of the representation of the array edge effects 221, to apply as pre-emphasis to the write data. The representation of the inverted array edge effects may then be fed to a multiplication operation 231 with a given set of write data 119, which has already been through the first, "standard" ISI correction process for within-block ISI, as represented by the process elements of FIG. 3 that are shared in common with method 100 of FIG. 2. The multiplication operation 231 then provides the doubly-corrected write data signal 233, of values to concurrently program into the cell array, that may be provided as output 235.

Figure 4:
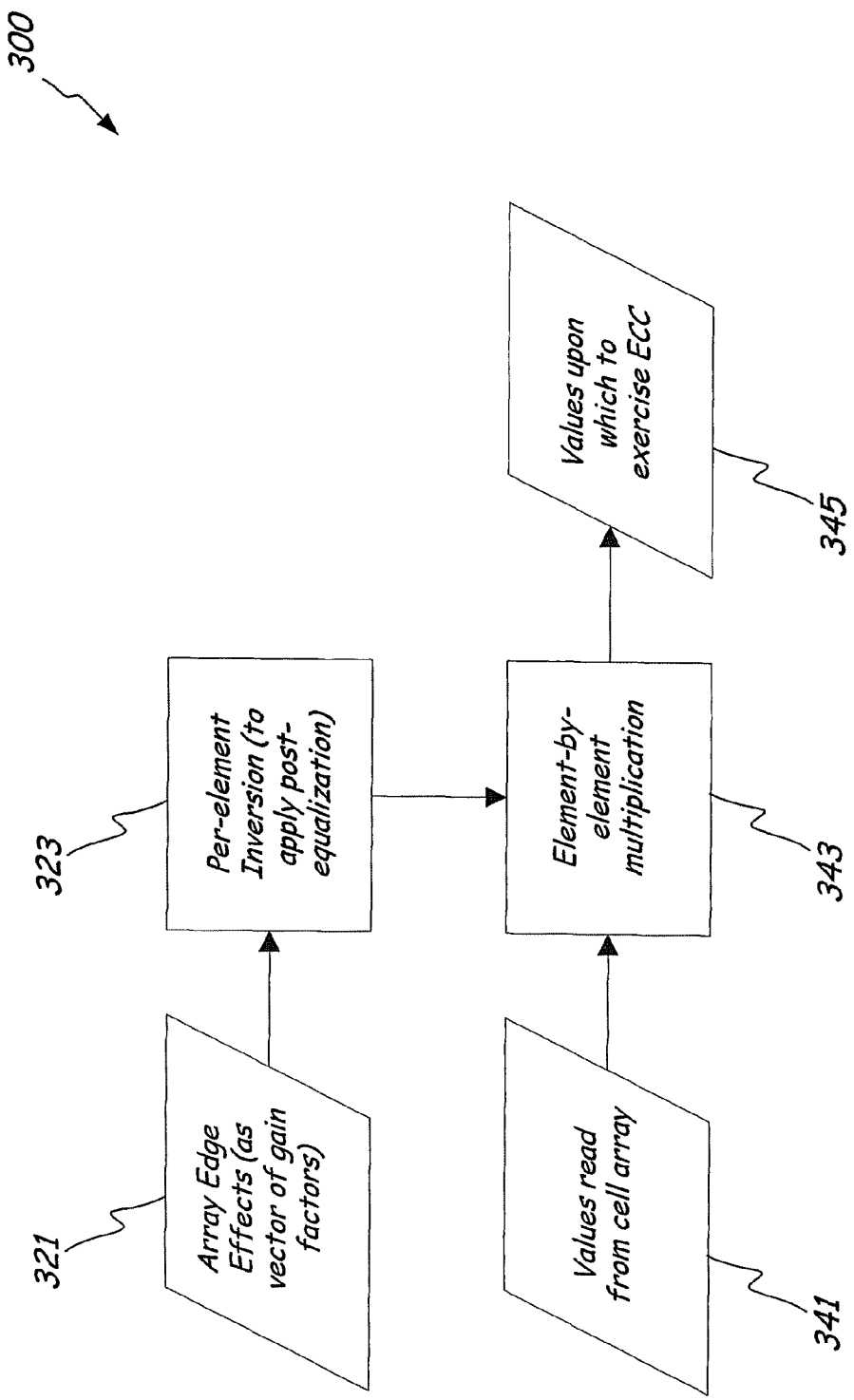
FIG. 4 depicts a block diagram for a method in accordance with another illustrative embodiment.

FIG. 4 depicts another illustrative embodiment for process 300 in which an array edge effect correction stage is performed at the time of a read operation as opposed to at the time of a write operation. In this illustrative embodiment, the intersymbol-interference-corrected encoding of the nth data signal may be written to a data storage cell array, and a subsequent read operation performed to read the intersymbol-interference-corrected encoding of the nth data signal, rendering the values 341 read from the cell array. Process 300 may then include providing the signal 321 encoding an inversion of a set of array edge effects applicable to a cell array to which the nth data signal was written, illustratively as a vector or other tensor of gain factors, and apply a per-element inversion step 323 to the array edge effects, to provide a post-equalization factor.

Process 300 may then include step 343 of element-by-element multiplication 343 of the per-element array edge effect inversion 323 and the values 341 read from the cell array, thereby combining the intersymbol-interference-corrected encoding of the nth data signal with the signal encoding the inversion of the set of array edge effects into a combined read signal. Process 300 may further include providing the corrected read signal values 345 as a combined read signal for output. Any of a variety of error correction techniques may also be used at various points during process 300 in combination with intersymbol interference correction, illustratively including Gray coding and/or trellis coding, for example. For example, Gray coding may be applied to the data storage, and decoding the Gray code may be performed in conjunction with the values read from the cell array 341. Trellis decoding may be performed in conjunction with corrected read signal values 345, or with the values read from the cell array 341, in different embodiments, the result of which may be provided as an error-corrected signal for output. Any of these cases may be considered to be performing one or more error correction techniques on the combined signal, thereby providing an error-corrected signal for output, in accordance with various embodiments.

Other illustrative embodiments may also include additional error correction steps at either or both of the write and/or read encoding stages. As another illustrative example, ISI correction encoding may also include techniques such as padding around the data and ISI behavior matrices with a buffer of zeroes in the matrices, such that circular convolution edge effects are reduced or eliminated. This may involve including additional margins of encoding data together with the signal data, for any or all of the prior-written data, the nth data signal, and the ISI behavior of other data, to reduce any non-linear unintended effects that may be induced by the array edge effects.

Supplemental data channels from the data storage may be used in support of error correction techniques, providing for the read signal values to be read out in higher resolution than the standard logic interface would allow, for example, by use of a flash chip's debug port, and some external hardware, in an illustrative embodiment. The higher-precision readout, as well as retention of higher precision at the output of any ISI-aware decoding, may be used to enable trellis decoding of the data sequence, in this illustrative example.

Figure 5:
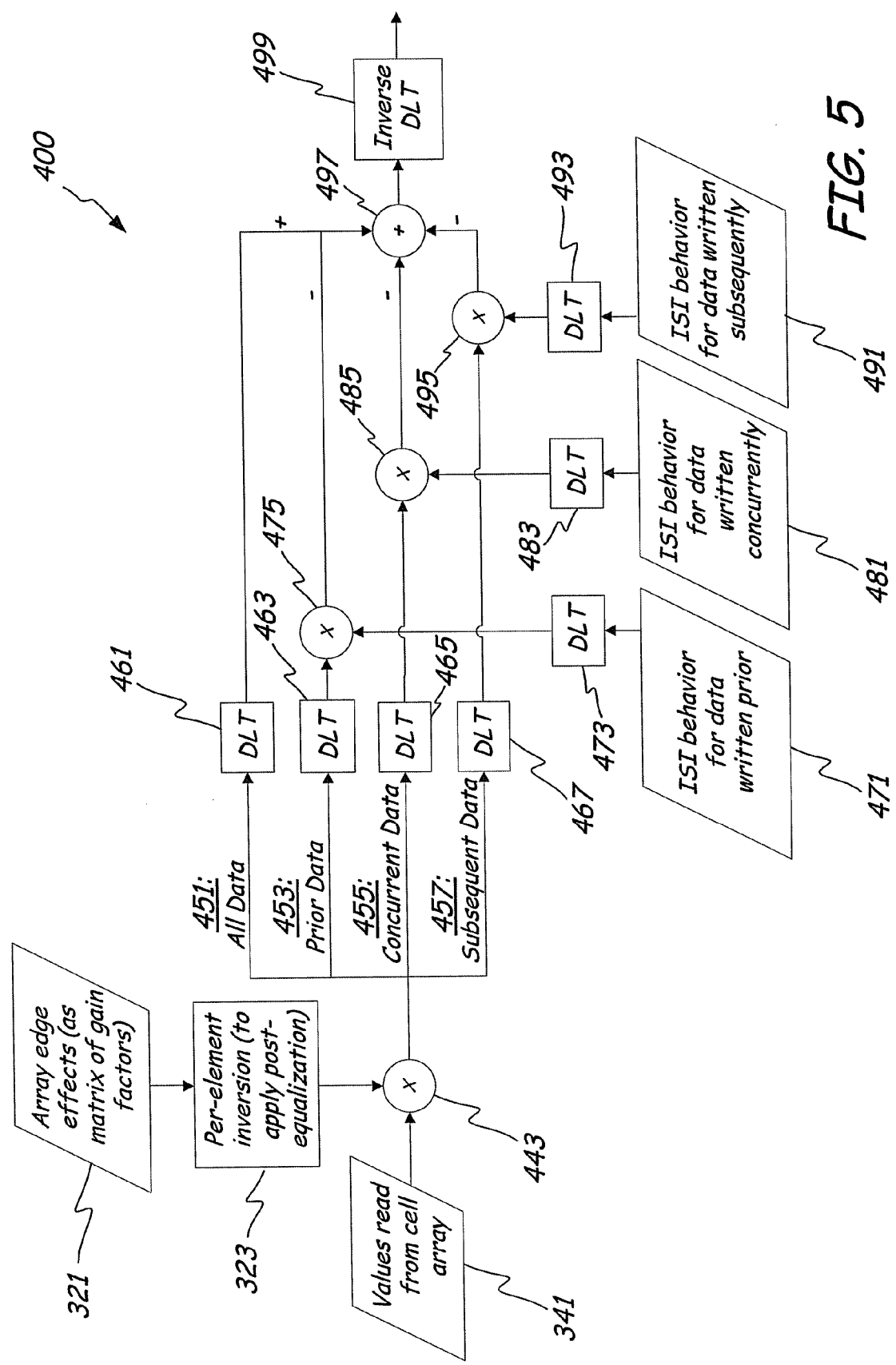
FIG. 5 depicts a block diagram for a method in accordance with another illustrative embodiment.

FIG. 5 depicts an intersymbol-interference-correction read process 400 in accordance with yet another illustrative embodiment, one that incorporates a relatively more comprehensive approach to intersymbol interference correction, which may either be reserved for error recovery, or in normal read operations, in different embodiments. Process 400 includes some initial elements shared in common with process 300 of FIG. 4, including initial read signal values 341 from the data storage cell array, array edge effects 321, and step 323 of inversion of the array edge effects, and then performing a multiplication operation 443 on the initial read signal values 341 and the inversion of the array edge effects 321.

Process 400 further includes using additional ISI knowledge to further improve the error rate. In accordance with an illustrative example, process 400 further includes taking the product resulting from multiplication operation 443 and deriving from it one or more of a prior data component 453, a concurrent data component 455, and a subsequent data component 457, along with an all data representation 451. This refers to data written concurrently with a target read data signal, in addition to any data written prior to or subsequently to the target read data signal, and may therefore account for all intersymbol interference that occurred before, during, and after a given portion of data was written to a data storage array. This process may be applied to each set of data that was concurrently written, to recover ISI-corrected data. For example, after the inverse discrete linear transform 499 depicted at the end of process 400, thereby producing an intersymbol-interference-corrected encoding of the nth data signal, all data points except those corresponding to the concurrent data may be discarded to recover only the ISI-corrected form of the concurrent data, in an illustrative embodiment.

This process may therefore provide an element of more comprehensive intersymbol interference correction than pre-write-operation intersymbol interference correction alone, in the case of any data stored in an array where it is not the most recently written data to that array or to that physical section of that array, because process 400 thereby may correct for any and all intersymbol interference that may have influenced the state of the data storage elements storing the target data sequence, including any ISI that may have taken place after the initial write operation, even if the initial write operation was done with a full ISI-correction process for all ISI that could have affected the data at the time of the write operation.

Process 400 may also be used for ISI correction on read-out where no ISI correction was performed during write, and where the data was originally written by a programming controller that was oblivious to ISI-correction encoding. For example, while the option of prior data component 453 is shown in FIG. 5, this may only be needed in the event where the data was originally encoded absent ISI-correction encoding; and in the case where the data was originally written with ISI correction, as illustratively indicated in method 100 of FIG. 2, the prior data component 453 and all operational aspects involving it in FIG. 5 may be omitted. This may also be true for either concurrent data component 455 or subsequent data 457, depending on the status and/or successful operation of ISI correction encoding during those phases of data write operations.

Process 400 may include steps such as taking a discrete linear transform of each of these components, illustratively including a discrete linear transform 461 of the all data representation 451, a discrete linear transform 463 of the prior data component 453, a discrete linear transform 465 of the concurrent data component 455, and a discrete linear transform 467 of the subsequent data component 457, in one illustrative example.

Having taken discrete linear transforms of the relevant portions of data used for this illustrative embodiment (or performed whatever other steps may be convenient within a given embodiment for manipulating the relevant portions of data), process 400 may then also incorporate combining the prior data component 453 with a set of intersymbol interference behavior 471 of the prior data component into a prior data intersymbol interference signal, combining the concurrent data component 455 with a set of intersymbol interference behavior 481 of the concurrent data component into a concurrent data intersymbol interference signal, and combining the subsequent data component 457 with a set of intersymbol interference behavior 491 of the subsequent data component into a subsequent data intersymbol interference signal. This may be done, in one illustrative embodiment, by means of the particular operations depicted in FIG. 5, including determining the discrete linear transforms (e.g. by calculations of fast Fourier transforms or other computational means in different examples) of the relevant ISI behavior including transform 473 of intersymbol interference behavior 471 of the prior-written data component, transform 483 of intersymbol interference behavior 481 of the concurrently-written data component, and transform 493 of intersymbol interference behavior 491 of the subsequently-written data component.

Process 400 may also include combining the combined read signal, the prior data intersymbol interference signal, the concurrent data intersymbol interference signal, and the subsequent data intersymbol interference signal into a combined intersymbol-interference-corrected read signal. As shown in FIG. 5, this may include performing multiplication operation 475 between the transform 463 of prior data component 453 and transform 473 of intersymbol interference behavior 471 of the prior-written data component, multiplication operation 485 between the transform 465 of concurrent data component 455 and transform 483 of intersymbol interference behavior 481 of the concurrently-written data component, and multiplication operation 495 between the transform 467 of prior data component 457 and transform 493 of intersymbol interference behavior 491 of the subsequently-written data component.

The results of multiplication operation 475 for the prior data, multiplication operation 485 for the concurrent data, and multiplication operation 495 for the subsequent data, may all be combined with the transform 461 of the all data representation 451, such as with summation operation 497, such that process 400 provides a combined intersymbol-interference-corrected read signal based on the summation operation 497 for output. This may include subtracting the prior data correction transform 475, the concurrent data correction transform 485, and the subsequent data correction transform 495 from the all data transform 461, as depicted in FIG. 5 (as illustratively indicated by the "+" symbol associated with the all data transform 461 and the "−" symbols associated with the prior data correction transform 475, the concurrent data correction transform 485, and the subsequent data correction transform 495 as fed into summation operation 497). This may also include ancillary steps such as taking the inverse transform of the result of summation operation 497, as depicted with the illustrative example of inverse discrete linear transform 499 of FIG. 5.

This method may also be applied iteratively to attempt additional correction in a non-linear ISI system. In an illustrative data storage embodiment based on multi-level cell NAND flash, for example, once an entire erasure block of data has been reconstructed one programming page at a time, or has been read out of an on-chip controller (which may perform different level recovery), data provided by an ISI-correction read process such as process 400 of FIG. 5 may be used to estimate the levels that would have been read out, and the difference between that and the observed mixing can be used to drive small, linear correction estimates. In this illustrative example, the non-linear mixing may be applied in the forward direction. The linear assumption only needs to be applied then to back-solve for small corrective factors, which are more likely to exhibit ISI behavior that is approximately linear and is susceptible to accurate approximation to linear behavior.

In another illustrative embodiment, additional data may be applied to account for programming effects that differentially affect subsequent data storage cells that retain their original erased value compared with other data storage cells that have an erased value but were energized for programming with write data.

Figure 6:
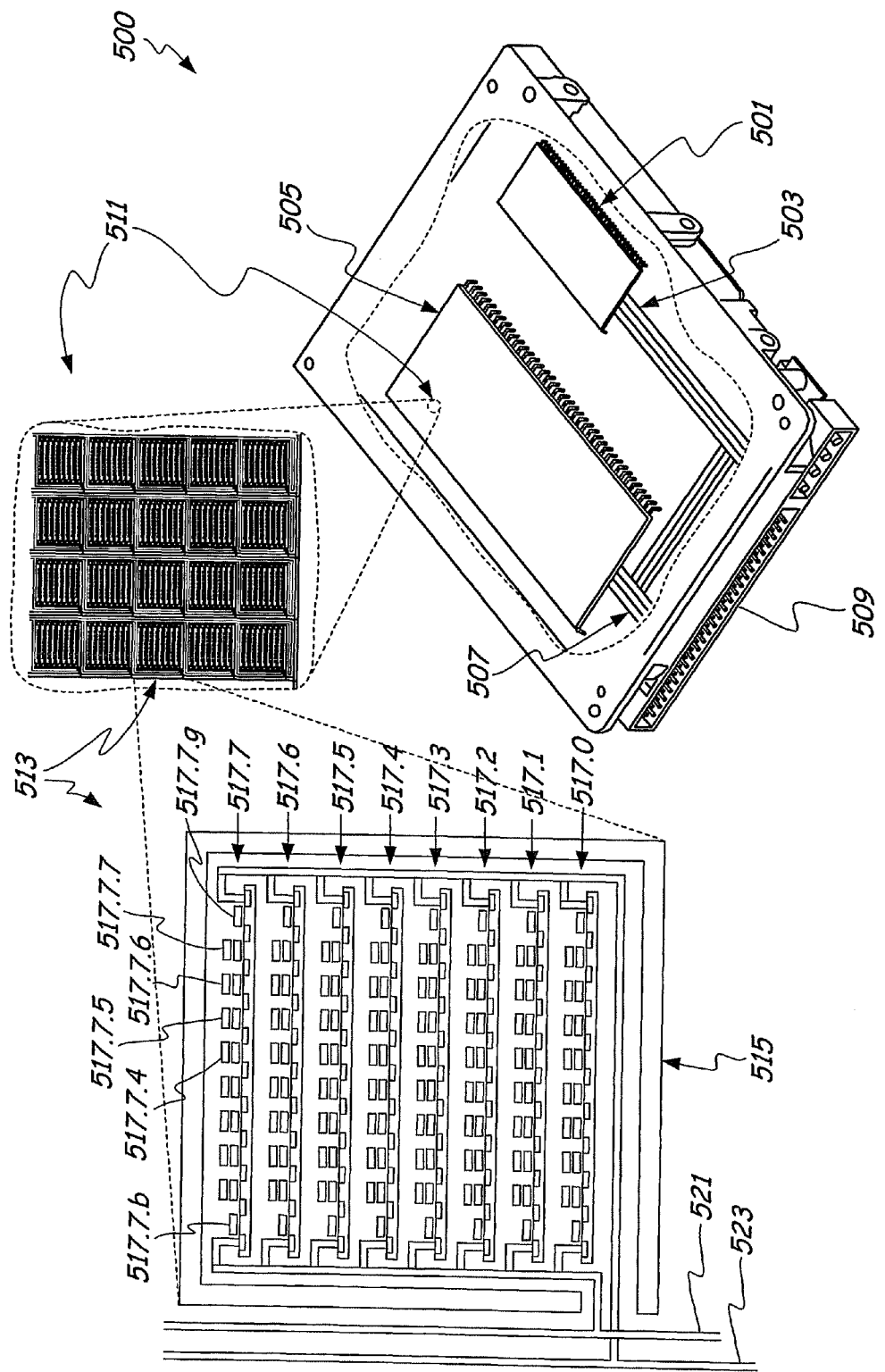
FIG. 6 depicts a data storage device in accordance with an illustrative embodiment.

FIG. 6 provides a simplified depiction of a data storage device 500 comprising programming controller 501 and data storage array 505, in accordance with another illustrative example. Programming controller 501 has input/output bus 503 and data storage array 505 has input/output bus 507, by which programming controller 501 and data storage array 505 may be communicatively connected to device interface 509, and may be communicatively connected to each other.

In various embodiments, programming controller 501 may be communicatively connected to either or both of data storage array 505 and/or device interface 509, and/or data storage array 505 may be communicatively connected to either or both of data storage array 505 and programming controller 501, and a wide variety of different communicative channel topologies, including on-chip, over a communication bus, and otherwise, may be used among the programming controller 501, the data storage array 505, device interface 509, and other components both within and outside data storage device 500. Any of these arrangements may allow programming controller 501 to receive write data signals, apply intersymbol interference correction conditioning to the write data signals, and output the resulting intersymbol-interference-corrected write signals to write to the data storage array 505.

Programming controller 501 may illustratively also perform additional tasks such as apply additional intersymbol-interference correction techniques to correct for circular convolution edge effects and/or physical array edge effects during either a write operation or a read operation, or apply additional intersymbol-interference correction to recorded data from the data storage array 505 during a read operation, as illustrative examples.

Data storage array 505 may include a plurality of data storage cells of various types, including flash memory, phase change memory, and other data storage technologies in different embodiments. Illustrative array section 511 of data storage cells is shown in a magnified internal view from within data storage array 505. The illustrative array section 511 of data storage cells is not represented to scale, and various embodiments of data storage systems may include any number, potentially up through the billions, trillions, or far more, of operably connected data storage cells. While data storage array 505 is depicted as a single integrated circuit in the illustrative example of FIG. 6, other embodiments of data storage systems may include any number of integrated circuits and/or other elements, within a single data storage device or among a number of networked or otherwise interconnected data storage devices, and may include a variety of different types of devices utilizing a number of different data storage technologies, distributed in a variety of different arrangements.

Illustrative array section 511 of data storage cells comprises a number of erasure blocks, while each of the erasure blocks comprises a number of programming pages, and each programming page comprises a number of data storage cells, in this illustrative embodiment. Illustrative array section 511 is an illustrative example of a small portion of the entirety of data storage array 505, which may contain up to a very large number of erasure blocks, programming pages, and data storage cells, and may also contain additional types of data storage besides the data storage cells as shown in illustrative array section 511. The data storage cells may also be either single-layer or multi-layer cells, and may each encode either a single bit per cell, or more than one bit per cell (including two bits per cell, one and a half bit per cell, three bits per cell, or otherwise, for example), or more than one cell per bit (for example in the case of applications specialized for radiation-hardened uses), and may also encode either one symbol per bit or one symbol per more than one bits, for example, where the intersymbol interference correction encoding may take place among symbols mapped to single bits or to multiple bits.

FIG. 6 also depicts an illustrative individual erasure block 513 as an arbitrarily selected illustrative erasure block out of illustrative array section 511 within data storage array 505, in a second magnified view from within illustrative array section 511. Erasure block 513 is communicatively connected with bit line 521 and ground line 523, and is mostly surrounded by erasure block shielding 515. Erasure block 513 illustratively includes eight programming pages 517.0 through 517.7 (collectively referred to as 517.M), and each of the programming pages 517.M illustratively includes eight data storage cells 517.M.N, an arbitrarily selected illustrative few of which are illustratively labeled in FIG. 6, i.e. the fifth through eighth data storage cells of programming page 517.7, labeled as 517.7.4, 517.7.5, 517.7.6, and 517.7.7. Each of the data storage cells is depicted with a bit gate positioned proximate to a P substrate, two N cells in the P substrate acting as a source and a drain, respectively, and a word line control gate positioned proximate to the bit gate, providing a NAND flash data storage cell, in this illustrative embodiment. Additional elements, such as the signal lines for the word line control gates, may also be comprised in an illustrative embodiment, but are omitted from the depiction of FIG. 6 merely for the sake of simplification.

The example of eight data storage cells per programming page, eight programming pages per erasure block, and the communicative signal line structure of bit line 521 and ground line 523 with erasure block 513, are all illustrative examples that are arbitrarily chosen to provide an illustrative, simplified representation for the purposes of the example in FIG. 6, while those skilled in the relevant field of art will recognize that a wide variety of other particular arrangements of data storage cells, programming pages, signal lines, and erasure blocks may be used in other embodiments within the scope of the present disclosure, including any number M of data storage cells per programming page or other group of data storage cells, and any number N of programming pages or other groups of data storage cells per erasure block or other type of collection of groups of data storage cells.

In various embodiments, the data storage cells can be accurately or approximately characterized by a linear impulse response, or can be made to be accurately or approximately characterized by a linear impulse response by means of correction factors for any non-linear perturbation effects, such that both data written to the data storage cells and the intersymbol interference behavior of the data storage cells are susceptible of being manipulated using discrete linear transforms, or other linearity-assuming techniques for convolving or otherwise processing the write signal and intersymbol interference response correction. A linear intersymbol interference response is an accurate model for many embodiments of flash memory, for example, because voltages applied to neighboring data storage cells to store charge on those cells exert intersymbol interference that is linearly additive on a target data storage cell, in an illustrative embodiment.

Programming page 517.7 is also communicatively connected to bit line 521 via bit line select transistor 517.7.*b*, and communicatively connected to ground line select transistor 523 via ground line select transistor 517.7.*g*. Each of the additional programming pages 517.0 through 517.6 in erasure block 513 may also be similarly arranged, and each of the erasure blocks 513.*x* in data storage array 505 may also be similarly arranged, although there may also be various differences in details of structure or function among different programming pages, erasure blocks, or sections of the data storage array 505 to serve various purposes in different embodiments.

As discussed above, intersymbol interference may naturally and perhaps unavoidably take place among any of the data storage cells 517.M.N in erasure block 513, or more generally among any of the data storage cells 513.*x*.M.N in data storage array 505, and is more and more of a constraint on reliable data storage the smaller the data storage cells and other chip features are and the denser and closer together the data storage cells and other chip features are. Trying to separate the data storage cells through the combination of distance and shielding materials to minimize intersymbol interference has been a substantial constraint on data storage density and reliability, but various embodiments disclosed herein instead incorporate intersymbol interference in the encoding of the write and read operations to and from the data storage cells of the data storage array, thereby providing for an inherently more efficient, denser, and more reliable data storage technology than was previously possible.

The depiction of FIG. 6 is not intended to represent the particular dimensions, parameters, or packaging of a specific configuration of a data storage system, but rather to provide a simplified example, while a very wide variety of configurations and permutations of parameters will be perceived as implicit in the present depiction and description by those skilled in the relevant field of art.

In another illustrative embodiment, for example, a data storage device based on phase-change memory rather than flash memory may be used. For example, the individual data storage cells may each comprise a phase-change memory element such as an element of chalcogenide glass. Data read and write signal lines through the data storage array may include write signal lines that provide a heating mechanism in connection with each of the chalcogenide glass elements, that are thereby configured to alternate the chalcogenide glass between two or more states. This may be done, for example, such as by applying either a relatively lower level of heat to a chalcogenide glass element such that the heat applied is sufficient to approximately fully crystallize the element, but not to melt it, thereby forcing that element into a crystalline state with a low electrical resistance, or by applying a relatively higher level of heat to the chalcogenide glass element such that the heat applied is sufficient to approximately fully melt the element, thereby forcing that element into an amorphous state with a high electrical resistance. In this illustrative embodiment of phase change memory, as with the flash memory embodiment discussed above, a linear impulse response may be an accurate model, because varying levels of heat applied to multiple neighboring data storage cells to change the physical state and therefore resistance of those cells exert intersymbol interference that is linearly additive on a target data storage cell, in an illustrative embodiment.

In still other embodiments based on phase change memory, multiple states besides only two may be susceptible of storage by each data storage cell. For example, a single data storage cell comprising a chalcogenide glass element may be susceptible of being controllably heated to any of four different temperatures that force the glass element into a fully crystalline state for the lowest of the four temperatures, a fully melted state for the highest of the four temperatures, or intermediately crystalline states for the two intermediate temperatures, all four states being controllably determined by heating-mechanism write signals and being reliably readable according to the four different levels of electrical resistance provided by the four different states.

This provides an illustrative example of encoding data in other than a 1:1 relation between bits and individual data storage cells, in this case encoding 2 bits per single data storage cell, while the intersymbol interference among the data storage cells may still be accurately modeled as having a linear impulse response, or susceptible of linear modeling with manageable approximation factors, with the various heating levels and electrical resistance levels of each of the cells surrounding a particular target cell exerting linearly additive intersymbol interference on that target cell, in various illustrative embodiments.

Figure 7:
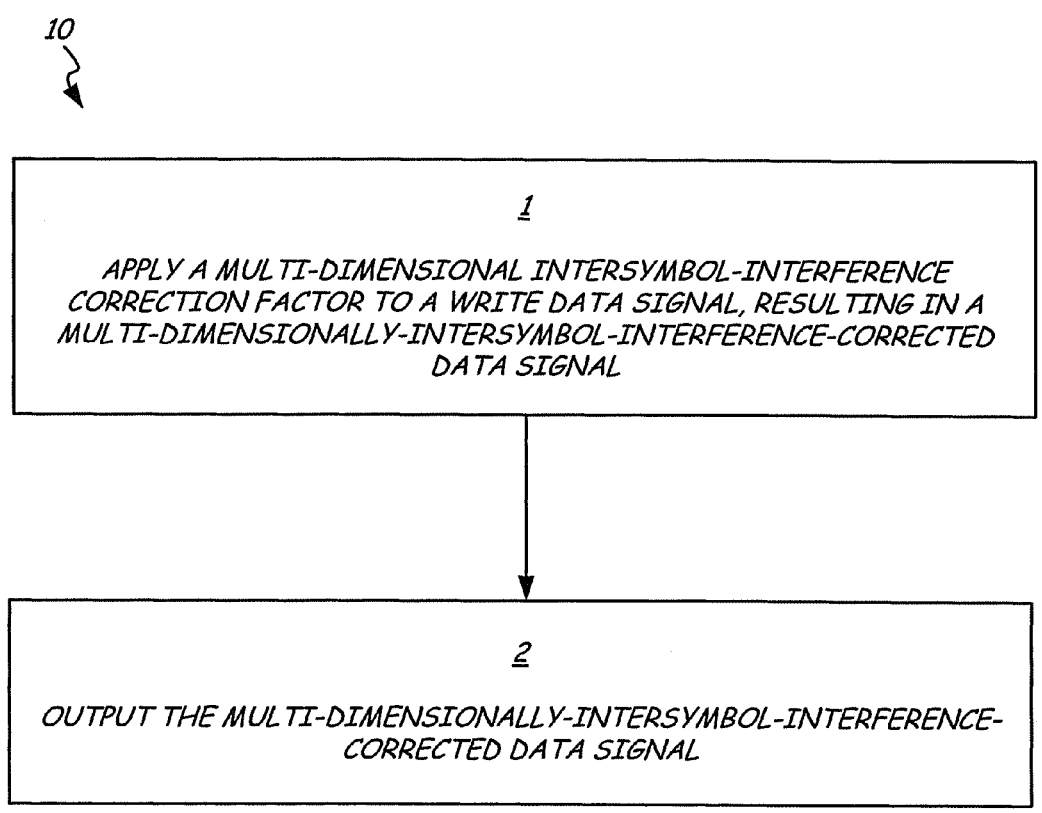
FIG. 7 depicts a flowchart for a method in accordance with an illustrative embodiment.

FIG. 7 depicts a flowchart for a method 10 in accordance with another illustrative embodiment of the present disclosure. Method 10 includes step 1, of applying a multi-dimensional intersymbol-interference correction factor to a write data signal, resulting in a multi-dimensionally-intersymbol-interference-corrected data signal; and step 2, of outputting the multi-dimensionally-intersymbol-interference-corrected data signal. Step 1 of applying the multi-dimensional intersymbol-interference correction factor may correspond in certain aspects with step 22 of FIG. 1 as discussed above, of providing an intersymbol interference signal applicable to the nth data signal based on a set of prior-written data in a data storage array and a set of intersymbol interference behavior of the set of prior-written data in the data storage array, and may illustratively be performed by a programming controller such as programming controller 501 of FIG. 6. Step 2 of outputting the multi-dimensionally-intersymbol-interference-corrected data signal may involve a programming controller such as programming controller 501 of FIG. 6 outputting the corrected encoding signal to a data storage array such as data storage array 505 of FIG. 6, thereby writing the multi-dimensionally-intersymbol-interference-corrected signal to the data storage cells of data storage array 505, in an illustrative embodiment.

The corrected data signal may be corrected for intersymbol interference in any multiple of dimensions, including two dimensions in one example, e.g. to correct for ISI in a two-dimensional array of data storage cells; or in three dimensions, in another example, e.g. to correct for ISI in a three-dimensional volume of an array of data storage cells, or to correct for known or anticipated changes in ISI over time in a two-dimensional data storage array; or in four or more dimensions, in other examples, e.g. to correct for known or anticipated changes in ISI over time and/or over other factors in either a two-dimensional array or three-dimensional volume of data storage elements; and/or in a fractional dimension, e.g. to correct for ISI effect components with fractional-dimension applications in combination with spatial and/or temporal ISI effects across a two-dimensional array or three-dimensional volume array of data storage elements, in other illustrative examples.

Step 2 of outputting the multi-dimensionally-intersymbol-interference-corrected data signal may involve may also involve providing MDISI-corrected write signals from an MDISI-determining programming controller or other type of MDISI-determining component or group of components to any other data storage array in any other accessible data storage component within a computing environment. Step 2 is therefore not limited to cases corresponding to the illustrative example of FIG. 6 in which the MDISI-corrected programming controller 501 is providing the MDISI-correction-encoding write signals for data storage array 505 within the same data storage device 500 as itself. Rather, in various other illustrative embodiments comprehended within the present disclosure, an MDISI-correction-encoding component may provide MDISI-corrected write signals to other data storage components within a digital device, computer, server, server rack or server farm, intranet, area network of any kind (including local area network, wide area network, etc.), other network, intermittently communicative group of elements, or any other type of computing environment or data-communicative environment in which it is possible for an MDISI-correction-encoding component to provide write signals to a data storage component.

The present disclosure therefore includes unexpected and novel advantages as detailed herein and as can be further appreciated from the claims, figures, and description by those skilled in the relevant art. Although some of the embodiments are described in reference to a data storage medium or a data storage system, the present disclosure encompasses various other embodiments with application to other data storage technologies and a wide variety of other types of devices. It is to be understood that even though numerous characteristics and advantages of various illustrative embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure, to the full extent indicated by the broad, general meaning of the terms in which the appended claims are expressed. It will be appreciated by those skilled in the art that the teachings of the present disclosure can be applied to a family of systems, devices, and means encompassed by and equivalent to the examples of embodiments described, without departing from the scope and spirit of the present disclosure. Further, still other applications for various embodiments, including embodiments pertaining to data storage media and data storage systems, are comprised within the present disclosure.

What is claimed is:

1. A method comprising:
    receiving a data signal as input to a processing component; and
    computing an intersymbol-interference-corrected encoding of the received data based on intersymbol interference behavior of a set of prior written data in a data storage array that is communicatively connected to the processing component,
    wherein the computing step comprises:
        providing an intersymbol interference signal applicable to the received data signal based on the set of prior-written data in the data storage array and a set of intersymbol interference behavior of the set of prior-written data in the data storage array; and
        combining the received data signal and the intersymbol interference signal applicable to the received data signal to obtain the intersymbol-interference-corrected encoding of the received data.

2. The method of claim 1, further comprising writing the intersymbol-interference-corrected encoding of the received data signal to a plurality of data storage cells of a memory storage device.

3. The method of claim 2, wherein the memory storage device to which the intersymbol-interference-corrected encoding of the received data signal is written comprises a flash memory data storage device or a multi-level cell memory data storage device.

4. The method of claim 2, wherein the memory storage device to which the intersymbol-interference-corrected encoding of the received data signal is written comprises a phase-change memory data storage device.

5. The method of claim 4, wherein the phase-change memory storage device comprises: memory cells that comprise chalcogenide glass, and a heating mechanism configured to alternate the chalcogenide glass between two or more states.

6. The method of claim 1, in which providing the intersymbol interference signal applicable to the received data signal based on a the set of prior-written data and the set of intersymbol interference behavior of the set of prior-written data further comprises taking a discrete linear transform of the set of prior-written data, taking a discrete linear transform of the set of intersymbol interference behavior of the set of prior-written data, multiplying the discrete linear transform of the set of prior-written data and the discrete linear transform of the set of intersymbol interference behavior, and providing the resulting product as the intersymbol interference signal applicable to the received data signal.

7. The method of claim 6, in which combining the received data signal and the intersymbol interference signal applicable to the received data signal into an intersymbol-interference-corrected encoding of the received data signal further comprises providing an intersymbol-interference-corrected transform by subtracting the intersymbol interference signal applicable to the received data signal from a discrete linear transform of the set of prior-written data.

8. The method of claim 7, in which combining the received data signal and the intersymbol interference signal applicable to the received data signal into an intersymbol-interference-corrected encoding of the received data signal further comprises taking an inverse discrete Fourier transform of the intersymbol-interference-corrected transform.

9. The method of claim 1, further comprising taking a discrete linear transform of any of the set of prior-written data, the set of intersymbol interference behavior of the set of prior-written data, and/or the received data signal, further in which taking the discrete linear transform comprises taking a fast Fourier transform.

10. The method of claim 1, further comprising providing a signal encoding an inversion of a set of array edge effects applicable to a concurrently written cell array to which the received data signal is to be written, combining the intersymbol-interference-corrected encoding of the received data signal with the signal encoding the inversion of the set of array edge effects into a combined signal, and providing the combined signal for writing to the concurrently written cell array.

11. The method of claim 1, further comprising writing the intersymbol-interference-corrected encoding of the received data signal to a cell array, subsequently reading the intersymbol-interference-corrected encoding of the received data signal, providing a signal encoding an inversion of a set of array edge effects applicable to a cell array to which the received data signal was written, combining the intersymbol-interference-corrected encoding of the received data signal with the signal encoding the inversion of the set of array edge effects into a combined read signal, and providing the combined read signal for output.

12. The method of claim 11, further comprising performing one or more error correction techniques on the combined signal, thereby providing an error-corrected signal for output.

13. The method of claim 12, in which the one or more error correction techniques comprises at least one of Gray decoding and/or trellis decoding.

14. The method of claim 13, further comprising:
deriving a prior data component, a concurrent data component, and a subsequent data component from the combined read signal;
combining the prior data component with a set of intersymbol interference behavior of the prior data component into a prior data intersymbol interference signal;
combining the concurrent data component with a set of intersymbol interference behavior of the concurrent data component into a concurrent data intersymbol interference signal;
combining the subsequent data component with a set of intersymbol interference behavior of the subsequent data component into a subsequent data intersymbol interference signal;
combining the combined read signal, the prior data intersymbol interference signal, the concurrent data intersymbol interference signal, and the subsequent data intersymbol interference signal into a combined intersymbol-interference-corrected read signal; and
providing the combined intersymbol-interference-corrected read signal for output.

15. The method of claim 1, in which combining the received data signal and the intersymbol interference signal applicable to the received data signal into an intersymbol-interference-corrected encoding of the received data signal, further comprises applying a correction factor to the intersymbol-interference-corrected encoding that models a correction for perturbations away from linearity in the impulse response of the intersymbol interference behavior.

16. The method of claim 1, further comprising incorporating a gain control component that compensates for write signal response constraints in the intersymbol-interference-corrected encoding of the received data signal in the data storage cells.

17. A method comprising:
applying, by a device, a multi-dimensional intersymbol-interference correction factor, which is computed based on intersymbol interference behavior of a set of prior written data, to a write data signal, to obtain a multi-dimensionally-intersymbol-interference-corrected data signal; and
outputting the multi-dimensionally-intersymbol-interference-corrected data signal.

18. A data storage device comprising:
a programming controller;
a plurality of memory cells, in communicative connection with the programming controller; and
a channel, in communicative connection with the programming controller and the plurality of memory cells;
in which the programming controller is configured to receive a data signal over the channel, compute an intersymbol-interference-corrected encoding of the data signal based on data previously written to the memory cells, and write the intersymbol-interference-corrected encoding of the data signal to the plurality of memory cells,
wherein the programming controller is configured to compute the intersymbol-interference-corrected encoding of the data signal based on the data previously written to the memory cells by:
determining an intersymbol interference correction factor applicable to the data signal based on the data previously written to the memory cells; and
combining the data signal with the intersymbol interference correction factor.

19. A controller comprising:
a processor; and
one or more input/output channels communicatively connected to the processor;
in which the processor is operatively configured to:
provide a discrete linear transform of data previously written to a memory storage array, a discrete linear transform of intersymbol interference behavior of the data previously written to the memory storage array, and a discrete linear transform of write data received for writing to the memory storage array;
multiply the discrete linear transform of data previously written to the memory storage array and the discrete linear transform of intersymbol interference behavior of the data previously written to the memory storage array into an intersymbol interference correction matrix;
subtract the intersymbol interference correction matrix from the discrete linear transform of the write data received for writing to the memory storage array, thereby providing an intersymbol-interference-corrected write matrix;
perform an inverse discrete linear transform on the intersymbol-interference-corrected write matrix; and
provide a signal based on the inverse discrete linear transform on the intersymbol-interference-corrected write matrix to the one or more input/output channels.

* * * * *